Feb. 24, 1953
H. C. BERGMANN
2,629,228
REFRIGERATOR TANK
Filed April 4, 1949
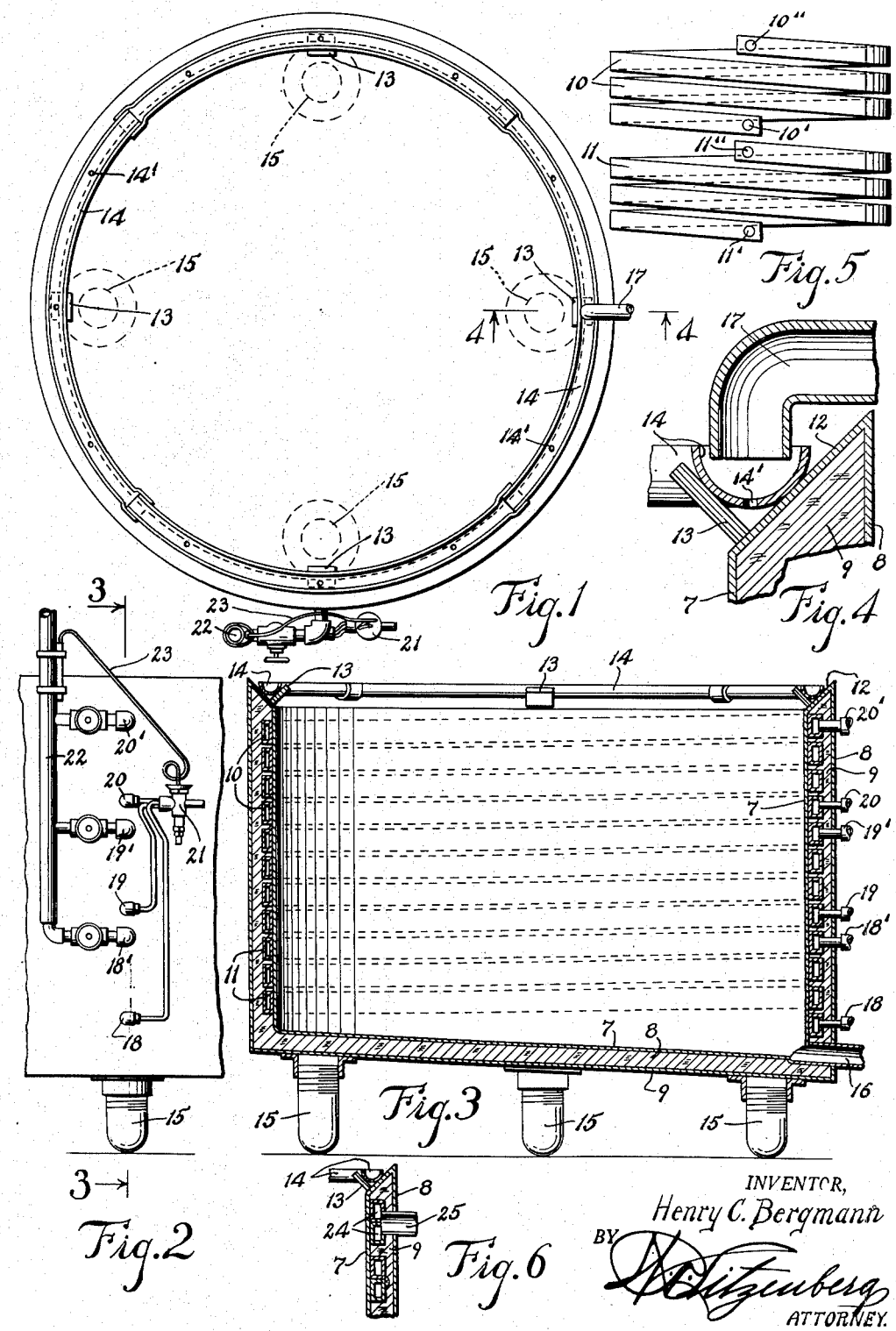
INVENTOR,
Henry C. Bergmann
BY
ATTORNEY.

Patented Feb. 24, 1953

2,629,228

UNITED STATES PATENT OFFICE 2,629,228

REFRIGERATOR TANK

Henry C. Bergmann, South Gate, Calif.

Application April 4, 1949, Serial No. 85,435

1 Claim. (Cl. 62—7)

This invention relates to refrigerator tanks, and more particularly to a cooling tank in which the liquid to be cooled is discharged on the wall of the tank or container, which wall has around its outer side a cooling or refrigerating coil, whereby the liquid as it runs down into the tank over the wall is cooled, thus avoiding the expense of a cooling coil above the tank and through which the liquid is run for cooling purposes before being discharged into said tank.

Among the salient objects of the invention are: to provide a tank or container having around its wall, on the outer side a coil for refrigerant to be circulated therein for the purpose of cooling the tank wall, said coil being preferably made of flat or rectangular tubing, in cross section, whereby to provide a maximum surface of the cooling coil or coils in contact with the wall of the tank.

Another object of the invention is to provide in combination with a tank or container an insulation covering for the outside thereof and within which the coils for the refrigerant are placed, said coils being placed directly against the wall of the container, whereby to get the maximum cooling action on the wall of said tank.

Another object of the invention is to provide in combination with a storage tank for milk or other liquid, a plurality of coils of tubular form, rectangular in cross section, with independent inlet and outlet for each coil for the refrigerant to be circulated therethrough, thus providing for a maximum of cooling action directly against the wall of the tank or reservoir, with the outer surrounding insulation, before referred to.

Another object of the invention is to provide a storage tank or reservoir having the top of its wall beveled or inclined inwardly, with means for holding a feed coil around said beveled top, for discharging the milk or other liquid upon said inclined top, whereby it will run into the tank upon the inside of the tank wall, thus insuring that it will have the maximum cooling action conveyed thereto through the wall of the tank or reservoir.

In order to more fully explain my invention, I have illustrated on the accompanying sheet of drawings, one practical embodiment thereof, which I will now describe. In the drawing:

Figure 1 is a top plan view of a tank or reservoir embodying my invention;

Figure 2 is a fragmentary side elevation, showing the side where the inlet and outlet pipe connections are connected;

Figure 3 is a cross sectional view through said tank, taken on line 3—3 of Fig. 2, showing the coils in section and also the insulation, and showing the inclined top of the wall;

Figure 4 is an enlarged sectional view, taken on line 4—4 of Fig. 1, showing the inclined wall, feed trough for the liquid, and means for supporting it;

Figure 5 is a side elevation of a couple of refrigerant coils of the flat or rectangular kind; and Figure 6 is a fragmentary sectional view through the wall, the coils and the feed or inlet pipe communicating with double coils.

Referring now in detail to the drawing, the tank or reservoir 7 is preferably of sheet metal, with an outer wall 8, with insulation material 9, such as cork or other suitable insulating material therebetween.

Wrapped around the outer side of the tank wall 7, are coils 10 and 11, of tubular material, shown of rectangular form in cross section, whereby to provide a maximum of tube surface against the tank wall to increase the cooling action on the tank wall.

The top of the tank is shown of tapering form, as at 12, tapering inwardly as shown, with a plurality of inclined fingers, as 13, distributed around the inclined top, as indicated.

Around the top of said tank, supported by said fingers 13, is a feed trough or tube for feeding milk, or other liquid, to the tank. This trough or tubular member is provided with spaced holes 14 along its bottom, as indicated, whereby any liquid running therein will flow out through said holes and trickle down on the inside of the tank wall.

Said tank is provided with suitable feet, as 15, 15, for supporting it. These feet are screw connected, as indicated, whereby to be adjusted for leveling the tank, as may be desired. It is desirable to have it slightly tilted, as indicated in Fig. 3, with a drain pipe 16. A supply pipe 17 is shown in Figs. 1 and 4 for supplying milk or other liquid to said tank in the manner indicated.

In Fig. 5, where I have shown two different coils, the inlets are designated 10' and 11', respectively, and the outlets are designated 10" and 11", respectively.

Referring to Fig. 2, and Fig. 3, three coils are indicated, with the inlets indicated 18, 19 and 20, respectively, from an expansion valve inlet 21, while the outlet connections are designated 18', 19' and 20', respectively, and run to a common pipe 22 leading to the source of refrigerant, and from which it is fed to the expansion valve 21 and to the coils through their inlets 18, 19 and 20.

A thermostat control member is designated 23 and connects the expansion valve 21 with the pipe 22, with which the outlets 18', 19' and 20' are connected, as shown in Fig. 2.

In Fig. 6, I have shown a double construction of coil, with a single pipe connection, as at 24 and 25. This is to increase the surface of the coil which is in engagement with the tank wall to be cooled. It will be understood, of course, that the coils can be made in any suitable size, in cross section, which will give the maximum contacting surface against the tank wall.

By thus providing means for cooling the liquid, as it is run into the tank or reservoir, I avoid the necessity of having a cooling system through which the liquid is run before it is delivered to the tank. The liquid is cooled direct as it runs into the tank.

The efficiency is increased by providing the refrigerant coils having flat surfaces bearing directly upon the wall of the tank.

I do not limit the invention to the details as shown for explanatory purposes, except as I may be limited by the hereto appended claim.

I claim:

A cooling tank for milk and the like having a double wall with an inwardly beveled annular cover top, an open annular trough to receive milk mounted on said beveled top and having discharge ports in its bottom directed on to said beveled top to flow down along the inner wall of said tank, a plurality of separate pipe coils of flat form in cross section between said double walls and bearing on and around the inner wall one above the other for cooling it, separate supply and return pipe connections for each coil for directing refrigerant fluid through said pipe sections for cooling the inner wall of said tank with separate quantities of fluid for each coil, an expansion valve with thermostat control interposed between the source of supply of fluid and said supply pipe connections, and means for drawing off the cooled milk from said tank.

HENRY C. BERGMANN.

REFERENCES CITED

The following references are of record in the file of this patent:

UNITED STATES PATENTS

| Number | Name | Date |
|---|---|---|
| 650,942 | Kreutzberg | June 5, 1900 |
| 706,511 | Barrath | Aug. 12, 1902 |
| 1,271,657 | Bock, Sr. | July 9, 1918 |
| 1,797,014 | Nichols | Mar. 17, 1931 |
| 2,006,299 | Kaestner | June 25, 1935 |
| 2,024,639 | Greene | Dec. 17, 1935 |
| 2,183,509 | Smith | Dec. 12, 1939 |
| 2,364,130 | Clancy | Dec. 5, 1944 |
| 2,409,661 | Carter | Oct. 22, 1946 |
| 2,446,289 | Love et al. | Aug. 3, 1948 |
| 2,557,252 | Bannister | June 19, 1951 |
| 2,576,050 | Soden | Nov. 20, 1951 |